(12) United States Patent
Lin

(10) Patent No.: US 8,111,825 B2
(45) Date of Patent: Feb. 7, 2012

(54) ENCRYPTION APPARATUS AND METHOD THEREFOR

(75) Inventor: Bo Lin, East Kilbride (GB)

(73) Assignee: Freescale Semiconductor, Inc., Austin, TX (US)

( * ) Notice: Subject to any disclaimer, the term of this patent is extended or adjusted under 35 U.S.C. 154(b) by 1044 days.

(21) Appl. No.: 11/994,256

(22) PCT Filed: Jun. 30, 2005

(86) PCT No.: PCT/EP2005/053118
§ 371 (c)(1),
(2), (4) Date: Dec. 28, 2007

(87) PCT Pub. No.: WO2007/003230
PCT Pub. Date: Jan. 11, 2007

(65) Prior Publication Data
US 2009/0034718 A1    Feb. 5, 2009

(51) Int. Cl.
*H04L 21/00* (2006.01)
(52) U.S. Cl. ........................................... 380/28
(58) Field of Classification Search .................. 380/28
See application file for complete search history.

(56) References Cited

U.S. PATENT DOCUMENTS 6,028,939 A * 2/2000 Yin .............................. 713/189
2004/0054623 A1 * 3/2004 Collins et al. ................... 705/39
2004/0131180 A1   7/2004 Mazuz et al.

FOREIGN PATENT DOCUMENTS

WO    0298052 A   12/2002

OTHER PUBLICATIONS

3GPP TS35.202.
Kasumi Specification—Release 4.
Balderas-Contreras; "High Performance Encryption Cores for 3G Networks"; Design Automation Conference 2005.

* cited by examiner

*Primary Examiner* — Nasser Moazzami
*Assistant Examiner* — Lisa Lewis

(57) ABSTRACT

A modified implementation of the Kasumi algorithm executes on a 32-bit processor using full 32-bit operations. The implementation comprises a series of four rounds, each round including an intermediate sub-function executed between two executions of an FL sub-function. The intermediate sub-function is functionally equivalent to two consecutive 16-bit FO sub-functions.

17 Claims, 4 Drawing Sheets

US 8,111,825 B2

ENCRYPTION APPARATUS AND METHOD THEREFOR

FIELD OF THE INVENTION

This invention relates to a method of operating on a 64-bit plaintext input using a key to produce a 64-bit ciphertext output of the type used, for example, to communicate data securely in a communications system, such as through execution of a Kasumi algorithm. This invention also relates to an encryption apparatus for operating on a 64-bit plaintext input using a key to produce a 64-bit ciphertext output.

BACKGROUND OF THE INVENTION

In the field of digital communications, in particular digital Radio Frequency (RF) communications, there is a need for secure and reliable communications. The Universal Mobile Telecommunications System (UMTS), a $3^{rd}$ Generation communications system developed by the $3^{rd}$ Generation Partnership Project (3GPP), employs a so-called "f8" confidentiality algorithm and a so-called "f9" integrity algorithm, for example as described in 3GPP TS 35.202 (v4.0.0 (2001-08), Document 2: KASUMI Specification (Release 4)). Both the "f8" and "f9" algorithms are based upon a Kasumi algorithm, which evolved from a so-called "Misty1" crypto algorithm developed by Mitsubishi Electronic Corporation, Japan.

The Kasumi algorithm is an 8-round Feistel block cipher that encrypts a 64-bit plaintext input into a 64-bit ciphertext output. Kasumi encryption and/or decryption is performed by wireless handset units and by Radio Network Controllers (RNCs) in the UMTS. Implementation of the Kasumi algorithm is becoming both increasingly important, and increasingly difficult with the introduction of High Speed Downlink Packet Access (HDPA) services, which places an even greater data throughput requirement, and hence performance burden, on the RNC that at present.

In this respect, the Kasumi algorithm was developed with an expectation that the algorithm would be executed on a 16-bit processors, execution of the algorithm in its current form being incompatible with other, more powerful, processors, such as 32-bit processors.

STATEMENT OF INVENTION

According to the present invention, there is provided a method of operating on a 64-bit plaintext input using a key to produce a 64-bit ciphertext output and an encryption apparatus as set forth in the appended claims.

BRIEF DESCRIPTION OF THE DRAWINGS

At least one embodiment of the invention will now be described, by way of example only, with reference to the accompanying drawings, in which.

DESCRIPTION OF PREFERRED EMBODIMENTS

Figure 1:
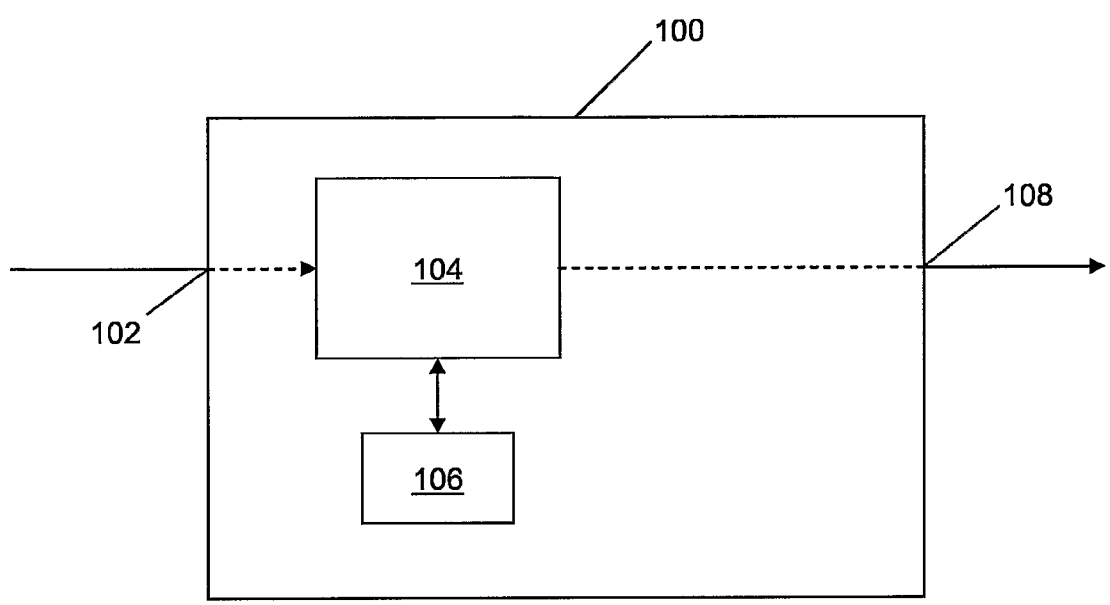
FIG. 1 is a schematic diagram of a processing resource implementing an embodiment of the invention.

Throughout the following description identical reference numerals will be used to identify like parts.

In a Universal Mobile Telecommunications System (UMTS), a Radio Network Controller (RNC) implements a Kasumi algorithm for encrypting a 64-bit plaintext input, using a 128-bit key, to generate a 64-bit ciphertext output. The encrypted 64-bit ciphertext is typically transmitted to a User Equipment (UE) unit in accordance with a known transmission technique implemented by the UMTS. Upon receipt of the 64-bit ciphertext, it is decrypted by the UE unit.

Referring to FIG. 1, in order to implement the above described Kasumi algorithm at the RNC, the RNC comprises an MPC7457 32-bit processor available from Freescale Semiconductor, Inc. and constituting a processing resource 100. The skilled person will, however, appreciate from the foregoing description that the above-described functionality can be implemented on other 32-bit processors.

The processing resource 100 comprises, inter alia, an input 102 coupled to a Load/Store Unit (LSU) 104 capable of communicating with an Integer Unit (IU) 106, the LSU 104 also being coupled to an output 108. The skilled person will, of course, appreciate that the processing resource 100 comprises other operational units not described herein for the sake of conciseness and simplicity, since such operational units do not have a direct bearing on the examples described herein.

Figure 2:
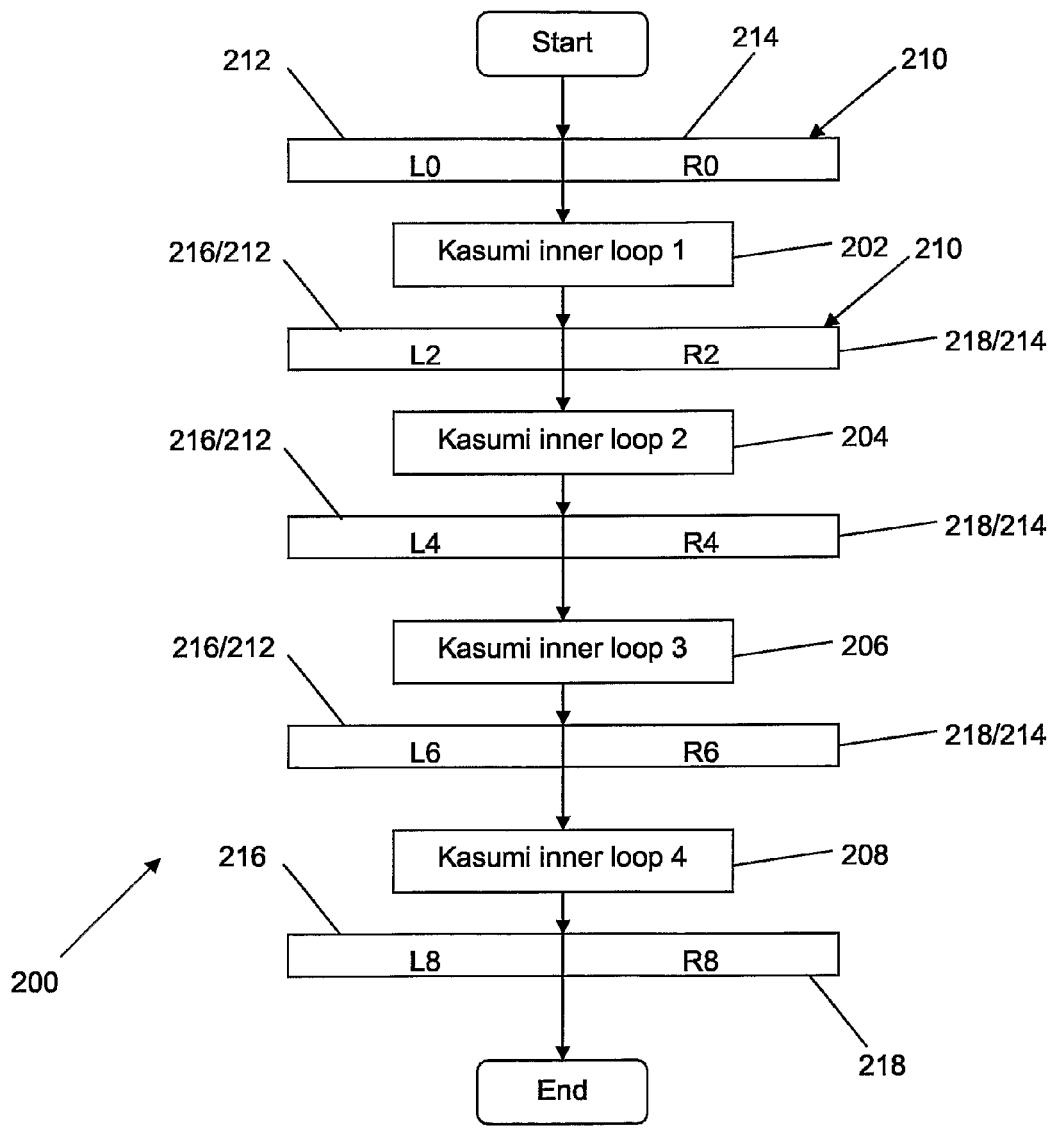
FIG. 2 is a flow diagram, in overview, of the embodiment of the invention.

Turning to FIG. 2, the processing resource 100 is appropriately programmed to execute a modified version of the Kasumi algorithm. In this respect, the modified version of the Kasumi algorithm yields a same output as the known 16-bit Kasumi algorithm, but the modified version of the Kasumi algorithm is compatible with execution on 32-bit processors, i.e. the modified Kasumi algorithm can take advantage of the ability of the processor to operate on blocks of 32-bits of data.

The modified version of the Kasumi algorithm 200 comprises a first loop 202, a second loop 204, a, third loop 206 and a fourth loop 208. The first loop 202 obtains a 64-bit plaintext data block, which is stored in a 64-bit register 210 as an input. The 64-bit plaintext data block is then used by the Kasumi algorithm 200 to form a first 32-bit round function input data block 212 and a second 32-bit round function input data block 214. Concatenation of the first and second 32-bit round function input data blocks 212, 214 yields the 64-bit plaintext data block. After operation on the first and second 32-bit round function input data blocks, the first loop 202 outputs a first 32-bit round function output data block 216 and a second 32-bit round function output data block 218.

The first and second 32-bit round function output data blocks 216, 218 are then stored in the 64-bit register 210 and serve as the first 32-bit round function input data block 212 and the second 32-bit round function input data block 214, respectively. The second loop 204 is then executed in the same way as described above and the pattern of using data blocks output by a loop as inputs for a subsequent loop is repeated until completion of execution of the fourth loop 208, whereupon the first and second round function output data blocks are concatenated to form the 64-bit ciphertext output.

Figure 3:
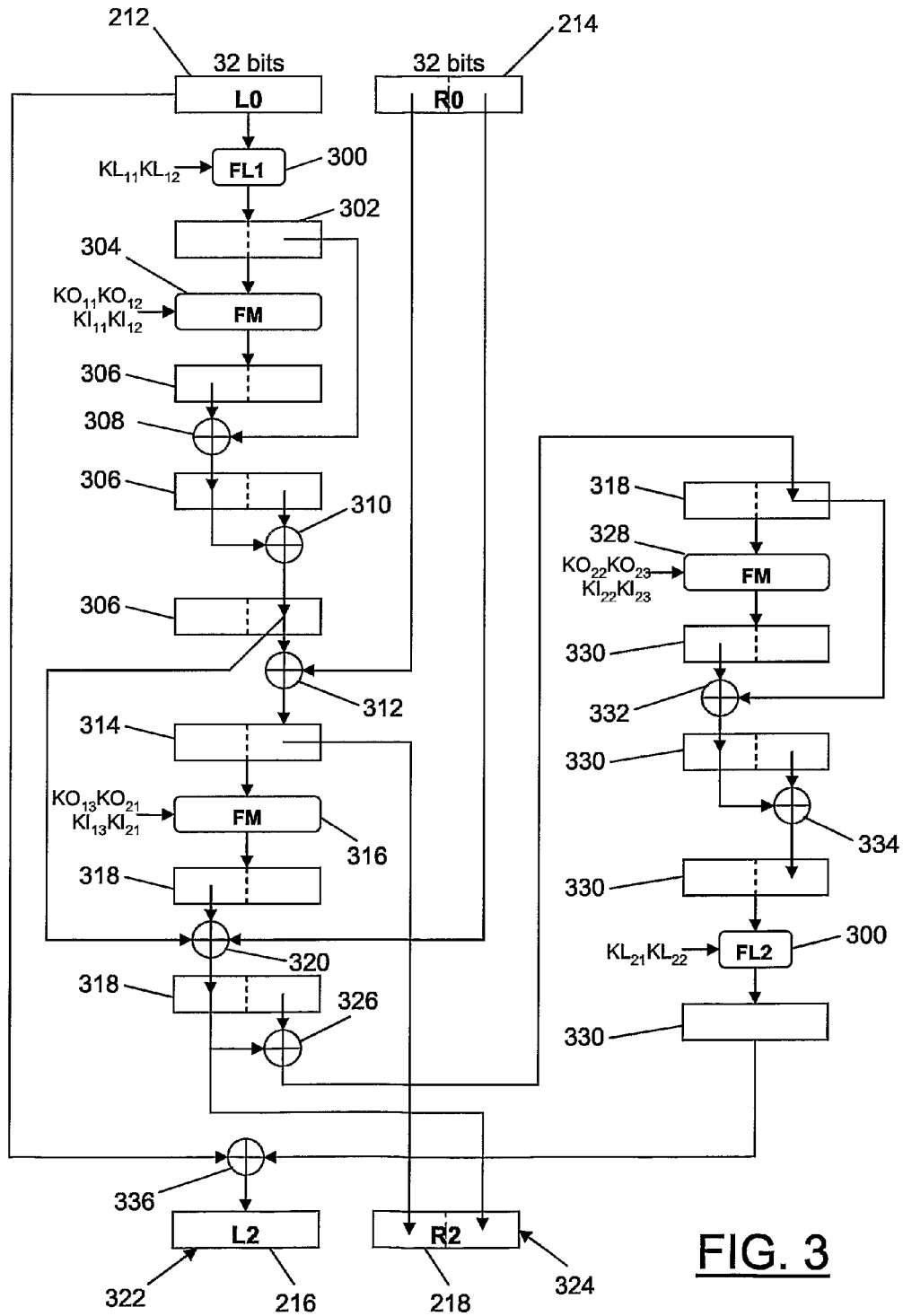
FIG. 3 is a flow diagram of a loop of the embodiment of FIG. 4 is a flow diagram of an FM sub-function of FIG. 3.

Referring to FIG. 3, the operation of the modified version of the Kasumi algorithm will now be described in relation to the first loop 202. For the sake of conciseness and clarity, execution of the second, third and fourth loops 204, 206, 208 will not be described herein, but the skilled person will appreciate from the foregoing description that execution of the first loop 202 described hereinbelow is simply repeated in the manner already described above.

The first round function input data block 212 is operated on by an FL sub-function block 300 known from 16-bit implementations of the Kasumi algorithm. However, due to the 32-bit capabilities of the processing resource 100, the FL sub-function block 300 executes the FL sub-function as a set of 32-bit operations. The FL-sub-function uses KL sub-keys, particularly $KL_{11}$ and $KL_{12}$ sub-keys, which are derived from the 128-bit key mentioned above and stored for retrieval in a look-up table (not shown). As the FL sub-function is already known to the skilled person, it will not be described in any further detail herein.

A first execution of the FL sub-function results in a first 32-bit word output, which is stored in a first temporary register 302. The first 32-bit word output is then used as an input to a first execution of an FM sub-function block 304 (described later herein in greater detail) along with KO and KI keys, particularly $KO_{11}$, $KO_{12}$, $KI_{11}$, $KI_{12}$ sub-keys, which are derived from the 128-bit key mentioned above and stored for retrieval in the look-up table. The first execution of the FM sub-function block 304 results in the generation of a second 32-bit word output, which is stored in a second temporary register 306.

A first exclusive-OR (XOR) operation is then performed by a first XOR gate 308 on 16 Most Significant Bits (MSBs) (a half-word) of the second temporary register 306 and 16 Least Significant Bits (another half-word) of the first temporary register 302, the result of the first XOR operation being stored as the 16 MSBs of the second temporary register 306.

Thereafter, a second XOR operation is performed by a second XOR gate 310 on 16 LSBs of the second temporary register 306 and the 16 MSBs of the second temporary register 306. The result of the second XOR operation is stored as the 16 LSBs of the second temporary register 306.

A third XOR operation is then performed by a third XOR gate 312 on the 16 LSBs of the second temporary register 306 and 16 MSBs of the 32-bit round function input data block 214, the result of the third XOR operation being stored as 16 LSBs in a third temporary register 314 and the 16 MSBs of the second temporary register 306 are copied to the third temporary register 314 as 16 MSBs of the third temporary register 314.

The 16 MSBs and 16 LSBs of the third temporary register 314 are then used as an input for a second execution of the FM sub-function block 316 along with the KO and KI keys, particularly $KO_{13}$, $KO_{21}$, $KI_{13}$, $KI_{21}$ sub-keys, which are retrieved from the look-up table. The second execution of the FM sub-function block 316 results in the generation of a third 32-bit word output, which is stored in a fourth temporary register 318.

A fourth XOR operation is then performed by a fourth XOR gate 320 on the 16 LSBs of the second temporary register 306, 16 MSBs of the fourth temporary register 318 and 16 LSBs of the 32-bit round function input data block 214, the result of the fourth XOR operation being stored as the 16 MSBs of the fourth temporary register 318.

A first output register 322 and a second output register 324 are provided to store the first and second 32-bit round function output data blocks 216, 218, respectively. In this respect, the 16 MSBs of the fourth temporary register 318 are copied to the second output register 324 as 16 LSBs of the second output register 324, and the 16 LSBs of the third temporary register 314 are copied to the second output register 324 as the 16 MSBs of the second output register 324.

A fifth XOR operation is then performed by a fifth XOR gate 326 on the 16 MSBs of the fourth temporary register 318 and the 16 LSBs of the fourth temporary register 318, the result of the fifth XOR operation being stored as the 16 LSBs of the fourth temporary output register 318.

The 16 MSBs and 16 LSBs of the fourth temporary register 318 are then used as an input for a third execution of the FM sub-function block 328 along with the KO and KI keys, particularly $KO_{22}$, $KO_{23}$, $KI_{22}$, $KI_{23}$ sub-keys, which are retrieved from the look-up table. The third execution of the FM sub-function block 328 results in the generation of a fourth 32-bit word output, which is stored in a fifth temporary register 330.

A sixth XOR operation is then performed by a sixth XOR gate 332 on 16 MSBs of the fifth temporary register 330 and the 16 LSBs of the fourth temporary register 318, the result of the sixth XOR operation being stored as the 16 MSBs of the fifth temporary output register 330.

A seventh XOR operation is then performed by a seventh XOR gate 334 on the 16 MSBs of the fifth temporary register 330 and 16 LSBs of the fifth temporary register 330, the result of the seventh XOR operation being stored as the 16 LSBs of the fifth temporary output register 330.

The fifth temporary output register 330 is then operated on by the FL sub-function block 300. The FL-sub-function uses the KL sub-keys, particularly $KL_{21}$ and $KL_{22}$ sub-keys, which are retrieved from the look-up table (not shown).

A second execution of the FL sub-function results in a fifth 32-bit word output, which replaces the content of the fifth temporary register 330.

An eighth XOR operation is then performed by an eighth XOR gate 336 on the content of the fifth temporary register 330, and the first 32-bit round function input data block 212, the result being stored in the first output register 322 and constituting the first round function output data block 216.

It should be appreciated that, in respect of the first round of the modified Kasumi algorithm, the first execution of the FL sub-function corresponds to a first execution of the FL sub-function in a first round of the known 16-bit implementation, and the second execution of the FL sub-function corresponds to a second execution in a second round of the FL sub-function in the known 16-bit implementation. An analogous correspondence exists between subsequent executions of the FL-sub function in respect of the modified Kasumi algorithm described herein and subsequent executions of the FL sub-function in subsequent rounds of the known 16-bit implementation of the Kasumi algorithm. Further, the operations and sub-function executions between executions of the FL sub-function described herein constitute an intermediate sub-function.

Figure 4:
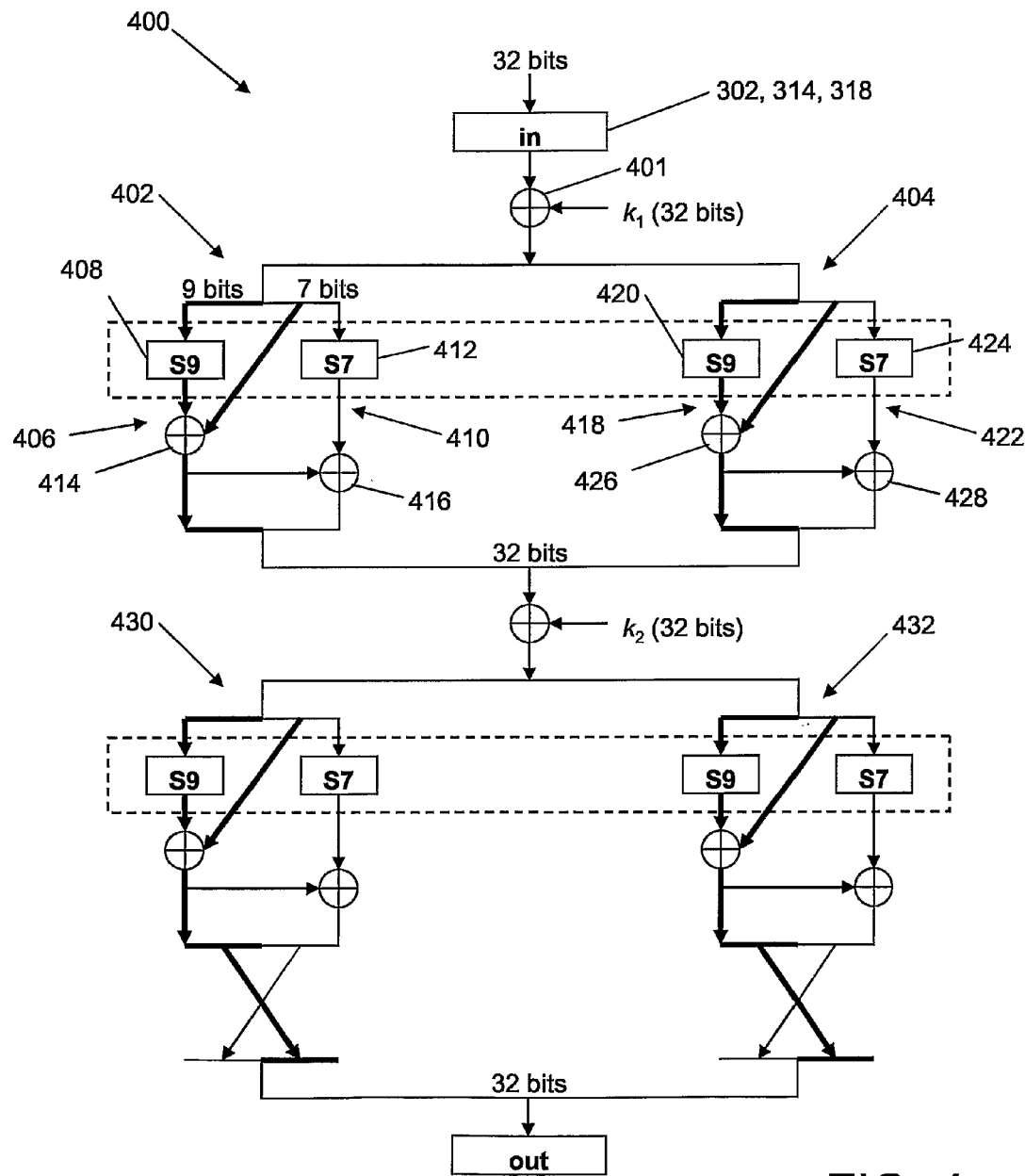

Referring to FIG. 4, the FM sub-function block 400 will now be described in more detail.

A 32-bit input word is initially obtained from, depending upon the when the FM sub-function block 400 is being executed, the first temporary register 302, the third temporary register 314 ox the fourth temporary register 318.

A ninth XOR operation is then performed by an ninth XOR gate 401 on the 32-bit input word and the KO sub-key ($k_1$) retrieved from the look-up table, the result of the ninth XOR operation being stored in a first FM output register (not shown).

16 MSBs of the first FM output register are accessed by a first branch 402 of the FM sub-function block 400, and 16 LSBs of the first FM output register are accessed by s second branch 404 of the FM sub-function block 400. A first sub-branch 406 of the first branch 402 comprises a first so-called "S9 bow" 408, known from the 16-bit implementation of the Kasumi algorithm and so will not be described further herein. A second sub-branch 410 of the first branch 402 comprises a first so-called "S7 box" 412, also known from the 16-bit implementation of the Kasumi algorithm and so will not be described further herein.

The 16 MSBs accessed by the first branch 402 are spilt into a first sub-block of 9 bits and a first sub-block of 7 bits. The first sub-block of 9 bits is operated on by the S9 box 408, a result of the S9 box 408 and the first sub-block of 7 bits, after undergoing a bit extend operation to provide two additional leading zero bits, being subjected to a tenth XOR operation by a tenth XOR gate 414. Similarly, the first sub-block of 7 bits is operated on by the S7 box 412, a result of the S7 box 412 and a result of the tenth XOR operation, after undergoing a bit truncation operation to discard two leading bits, being subjected to an eleventh XOR operation by an eleventh XOR gate 416. The result of the tenth and eleventh XOR operations are then concatenated to form a first 16-bit half-word output.

At the second branch 404 of the FM sub-function block 400, 16 LSBs of the first FM output register are accessed by a second branch 404 of the FM sub-function block 400. A third sub-branch 418 of the second branch 404 comprises a second S9 box 420, again known from the 16-bit implementation of the Kasumi algorithm. A fourth sub-branch 422 of the second branch 404 comprises a second S7 box 424, also known from the 16-bit implementation of the Kasumi algorithm.

The 16 LSBs accessed by the second branch 404 are spilt into a second sub-block of 9 bits and a second sub-block of 7 bits. The second sub-block of 9 bits is operated on by the second S9 box 420, a result of the second S9 box 420 and the second sub-block of 7 bits, after undergoing a bit extend operation to provide two additional leading zero bits, being subjected to a twelfth XOR operation by a twelfth XOR gate 426. Similarly, the second sub-block of 7 bits is operated on by the second S7 box 424, a result of the second S7 box 412 and a result of the twelfth XOR operation, after undergoing a bit truncation operation to discard two leading bits, being subjected to a thirteenth XOR operation by a thirteenth XOR gate 428. The result of the twelfth and thirteenth XOR operations are then concatenated to form a second 16-bit half-word output.

The first and second 16-bit half-word outputs are stored in an FM temporary register (not shown), thereby concatenating the first and second 16-bit half-word outputs.

A fourteenth XOR operation is then performed on the content of the FM temporary register and the KI sub-key ($k_2$) retrieved from the look-up table.

The FM sub-function block 400 also comprises a third branch 430 almost identical in structure and function to the first branch 402, and a fourth branch 432 identical in structure and function to the second branch 404. Consequently, the structure of the third and fourth branches 430, 432 will not be described further herein, other than mentioning that the result of the fourteen XOR operation is subjected to processing by the third and fourth branches 430, 432, and that the third and fourth branches 430, 432 differ in functionality from the first and second branches 402, 404 in that prior to termination of the third and fourth branches 430, 432, the bit positions of the 9 MSBs are swapped with the bit positions of 7 LSBs. The result of the processing is then stored, depending upon when the FM sub-function block 400 is being executed, in the second temporary register 306, the fourth temporary register 318 or the fifth temporary register 330.

It is thus possible to provide a method and apparatus for performing an optimized implementation of the Kasumi security algorithm on a 32-bit processor using full 32-bit operations, for example a 32-bit RISC core. The modified Kasumi algorithm executes in four rounds as opposed to eight rounds in the case of the 16-bit implementation of the Kasumi algorithm. Consequently, a significant increase in throughput performance can be achieved in a purely software implementation when compared with a 16-bit implementation of the Kasumi algorithm. Further, four consecutive data-independent lookups in respect of the S9 and S7 boxes need to tale place as opposed to both two and four consecutive lookups needed per round in the 16-bit implementation of the Kasumi algorithm. As a result, the modified Kasumi algorithm described herein is more streamlined and more efficient for pipelined implementation than the 16-bit implementation. Additionally, the modified Kasumi algorithm can be implemented to process aggregated traffic using for example, a so-called AltiVec Single Instruction, Multiple Data (SIMD) engine provided in some 32-bit processors available from Freescale Semiconductors, Inc.

The invention claimed is:

1. A processor-implemented method of operating on a 64-bit plaintext input using a key to produce a 64-bit ciphertext output, the method comprising the steps of:
   at the processor, sequentially iterating a round function a number of times using the key to generate the 64-bit ciphertext output, the round function comprising:
      obtaining a first 32-bit round function input data block and a second 32-bit round function input data block;
      executing an FL sub-function using the first 32-bit round function input data block so as to generate a first interim output data block;
      executing an intermediate sub-function using the first interim output data block using the second 32-bit round function input data block so as to generate a second interim output data block, the intermediate sub-function being functionally equivalent to execution of two consecutive 16-bit FO sub-functions, the intermediate sub-function comprising a plurality of exclusive-OR operations using pairs of half-words of data;
      executing the FL sub-function using the second interim output data block so as to generate a third 32-bit interim output data block;
      performing an exclusive-OR operation on the first 32-bit round function input data block and the third 32-bit interim output data block so as to generate a first 32-bit round function output data block;
      using a first intermediate result and a second intermediate result generated by the intermediate sub-function so as to generate a second 32-bit round function output data block; and
   providing a 64-bit ciphertext output based on the second 32-bit round function output data block, wherein the number of times of execution of the round function is four, and wherein execution of the FL sub-function is a 32-bit operation.

2. A method as claimed in claim 1, wherein the 64-bit plaintext input is a concatenation of the first and second 32-bit round function input data blocks.

3. A method as claimed in claim 1, wherein the first 32-bit round function output data block serves as the first 32-bit round function input data block for a subsequent iteration of the round function and the second 32-bit round function output data block serves as the second 32-bit round function input data block for the subsequent iteration of the round function.

4. A method as claimed in claim 1, wherein the key is a 128-bit key.

5. A method as claimed in claim 1, wherein execution of the intermediate sub-function is a 32-bit operation.

6. A method as claimed in claim 1, wherein the intermediate sub-function comprises a plurality of executions of a 32-bit Fl sub-functions.

7. A method as claimed in claim 6, wherein each of the 32-bit Fl sub-functions comprises a plurality of S-Box sub-functions arranged to be executable in respect of 32-bit data blocks.

8. A method as claimed in claim 6, wherein the plurality of exclusive-OR operations are performed between executions of the 32-bit F1 sub-function.

9. A method as claimed in claim 8, wherein the half-words of data are derived from the first interim output data block, outputs of the 32-bit F1 sub-function and/or the second 32-bit round function input data block.

10. A method as claimed in claim 1, the method further comprising:
   generating KL sub-keys from the key; and
   using the KL sub-keys in the FL sub-function.

11. A method as claimed in claim 1, the method further comprising:
   generating KO and KI sub-keys from the key; and
   using the KO and KI sub-keys in the 32-bit F1 sub-function.

12. A method as claimed in claim 11, wherein the KO and KI sub-keys are respectively applied as blocks of 32-bits.

13. A method as claimed in claim 1, wherein after iterating the round function the number of times, the 64-bit ciphertext output is a concatenation of the first and second 32-bit round function output data blocks.

14. A hardware encryption apparatus for operating on a 64-bit plaintext input using a key to produce a 64-bit ciphertext output, the apparatus comprising a processor arranged to support:
   a round function unit which, when executed, uses the key and executable a number of times to generate the 64-bit ciphertext output, the round function block comprising:
      a first input which, when executed, receives a first 32-bit round function input data block, and a second input which, when executed, receives a second 32-bit round function input data block;
      a first FL sub-function unit which, when executed, performs an FL sub-function in using the 32-bit round function input data block so as to generate a first interim output data block;
      an intermediate sub-function unit which, when executed, performs an intermediate sub-function using the first interim output data block using the second 32-bit round function input data block so as to generate a second interim output data block, the intermediate sub-function being functionally equivalent to execution of two consecutive 16-bit FO sub-functions;
      a second FL sub-function unit which, when executed, performs the FL sub-function using second interim output data block so as to generate a third 32-bit interim output data block;
      an exclusive-OR gate which, when executed, operates on the first 32-bit round function input data block and the third 32-bit interim output data block so as to generate a first 32-bit round function output data block; and
      a register which, when executed, stores a second 32-bit round function output data block generated by using a first intermediate result and a second intermediate result generated, when in use, by the intermediate sub-function; and
      an output which, when executed, provides the 64-bit ciphertext output based on the second 32-bit round function output data block, wherein the number of times of execution of the round function is four, and wherein execution of the FL sub-function is a 32-bit operation.

15. An apparatus as claimed in claim 14, wherein the 64-bit plaintext input is a concatenation of the first and second 32-bit round function input data blocks.

16. An apparatus as claimed in claim 14, wherein the first 32-bit round function output data block serves as the first 32-bit round function input data block for a subsequent iteration of the round function and the second 32-bit round function output data block serves as the second 32-bit round function input data block for the subsequent iteration of the round function.

17. An apparatus as claimed in claim 14, wherein the intermediate sub-function comprises a plurality of executions of a 32-bit F1 sub-functions.

* * * * *